Sept. 4, 1956  J. W. SAWYER ET AL  2,761,327
GROOVING OF HELICAL GEARS TO REDUCE NOISE
Filed May 19, 1950  4 Sheets-Sheet 1

INVENTORS
JOHN W. SAWYER
GEORGE O. HAZZARD
JOHN G. McCUBBIN
BY
ATTORNEYS

INVENTORS
JOHN W. SAWYER
GEORGE O. HAZZARD
JOHN G. McCUBBIN

ATTORNEYS

INVENTORS
JOHN W. SAWYER
GEORGE O. HAZZARD
JOHN G. McCUBBIN

Sept. 4, 1956  J. W. SAWYER ET AL  2,761,327
GROOVING OF HELICAL GEARS TO REDUCE NOISE
Filed May 19, 1950  4 Sheets—Sheet 4

INVENTORS
JOHN W. SAWYER
GEORGE O. HAZZARD
JOHN G. McCUBBIN

BY

ATTORNEY

United States Patent Office 2,761,327
Patented Sept. 4, 1956

2,761,327

GROOVING OF HELICAL GEARS TO REDUCE NOISE

John W. Sawyer, Arlington, Va., George O. Hazzard, Drexel Hill, Pa., and John G. McCubbin, Washington, D. C.

Application May 19, 1950, Serial No. 163,042

10 Claims. (Cl. 74—443)

(Granted under Title 35, U. S. Code (1952), sec. 266)

The invention described herein may be manufactured and used by or for the Government of the United States of America for governmental purposes without the payment of any royalties thereon or therefor.

This invention relates generally to reduction of noise from power transmitting gears and more particularly to means giving added resilience to the teeth and to means for reducing the sounds from successive tooth engagements by altering the frequency of occurrence of such engagements.

Various means have been employed to give resilience to gear teeth, including longitudinally split teeth, damping rings within or around the face of the gear or pinion, resilient material bonding a gear face to a gear wheel, helically cut gears, and circumferentially slotted or laminated gear faces. Each of these devices has possible advantages and applications, but leaves the problem of silencing of gears carrying considerabe power largely unsolved. The present invention provides a material improvement of importance especially in regard to eliminating noise from ships by which the ships may be detected and tracked by sonar gear at considerable distances.

A wide spectrum of frequencies exists in the normal sound output from a ship under way, but the very low frequency and high frequency components are less useful for locating and tracking ships than the intermediate frequency sounds. The higher supersonic frequencies emanating from a ship are so rapidly attenuated in water travel as to be of little use for long distance tracking observations.

Propeller pulsation noises of a ship are in the characteristically low frequency range which is ordinarily useless in tracking and locating. A strong source of intermediate frequency sound originating in reduction gears may be transmitted both through the hull of the ship and the propeller blades to the water. This source is present in turbine propulsion systems and any other systems wherein gears are employed to transmit the driving power, and is highly important as a source of tracking and locating sound when all prior practicable measures for gear silencing have been placed in effect. The fundamental frequency of this sound output is the frequency of meshing of the driving gears. The volume of such sound is large because of the large amount of power transferred to the water directly through shaft and propeller. The volume of observable sound is a direct function of the excess in peak pressure between gear teeth over the background or steady pressure corresponding to the uniform flow of power. The present invention provides means for reducing the pressure peaks and the ratio thereof to background, and at the same time alters the effective frequency of tooth meshing by a large factor so as to largely eliminate those frequencies most readily transmitted and observed. The higher resultant frequency of the pressure peaks also is largely dissipated before communication to the water in a manner similar to the selective filtering out of high frequencies in an electrical circuit, the higher frequencies of mechanical vibrations being subject to mechanical absorption.

An object of the present invention is accordingly to decrease the output of noise resulting from tooth meshing in a power transmission gear.

Another object is to increase the frequency of tooth meshing thereby converting the sound output to a frequency subject to rapid attenuation within the machine and within an ambient medium.

A further object of the invention is to decrease the peak pressure between gears during the meshing thereof.

A still further object is to distribute the tooth meshing pressure peaks over a number of increments for each tooth engagement.

A final object is to increase the resilience of the mating teeth, whereby pressure peaks are diminished.

The exact nature of this invention as well as other objects and advantages thereof will be readily apparent from consideration of the following specification relating to the annexed drawings in which.

Figure 1:
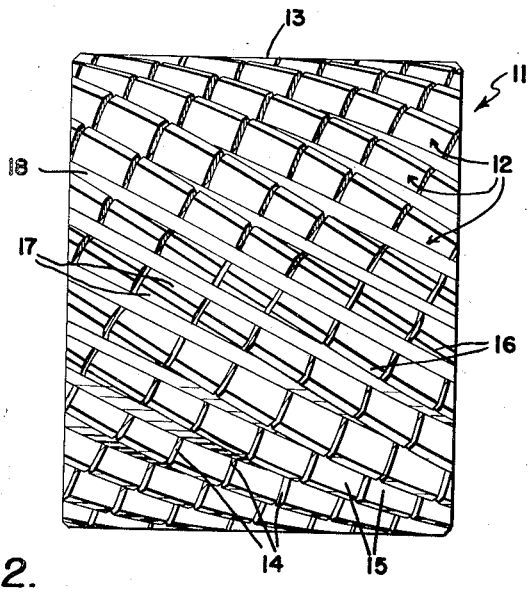
Fig. 1 is an elevational view of a helical pinion gear employing the present invention.

Referring now to the drawings, wherein like reference characters designate like parts throughout the several views, there is shown in Fig. 1 a pinion 11 having helically cut teeth 12 arranged across the face 13 at a helix angle H more clearly shown in the diagrammatic views, and having helically cut grooves or slots 14 at right angles to the teeth 12. A number of advantages are inherent as hereinafter explained in causing the grooves 14 to intersect the teeth at substantially right angles, thereby causing the groove helix angle to be approximately the complement of the helix angle H. The preferred form of the invention maintains this perpendicularity as shown in the several views.

Figure 2:
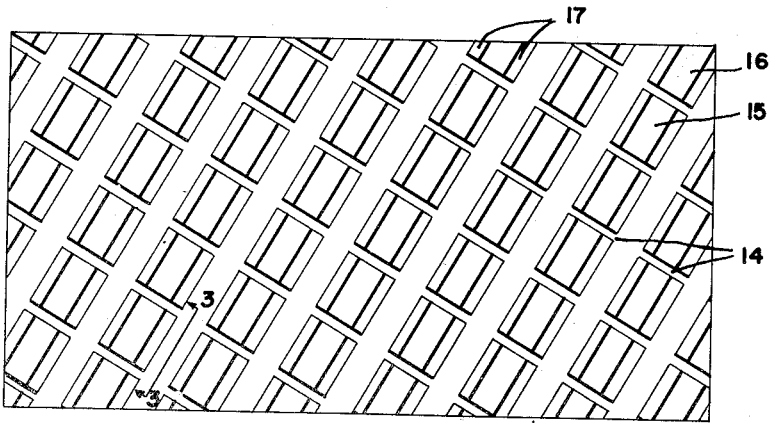
Fig. 2 shows a grooved pinion in a rolled-out view, the helically cut grooves being perpendicular to the teeth.
Figure 3:
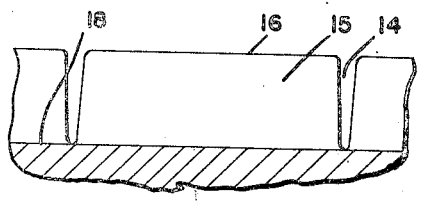
Fig. 3 is a transverse view of a fragment of a tooth showing an alternative groove section as along line 3—3 of Fig. 2.

The grooves 14 may be constructed by any convenient means as by milling or hobbing in the general manner of forming the gear teeth, except that a narrow slot is preferred to a broad groove in order to preserve as much as possible of the material of the teeth for greater strength. Certain hobbing operations may be more conveniently carried out if the groove is caused to taper inwardly with increasing depth, as shown in Fig. 3. The spacing of the gear slots is variable in accordance with the face width F selected for a particular power transmitting capacity, and in accordance with the helix angle H selected. The tooth segments 15 between grooves should be large with respect to groove width to retain approximately the full strength of the ungrooved tooth. The example illustrated in Fig. 1 has segments 15 approximately twelve times the groove width, and for a face width of three inches has seven slots per tooth and a helix angle H of about 28 degrees. The example of Fig. 2 has a 30 degree helix and six slots for about 3 inches of face width.

The grooves are illustrated as extending the full depth of the teeth, being tangent to a helix within a cylindrical surface passing through successive tooth roots 18. A circle in the plane of rotation at the tooth roots, ordinarily referred to as the root circle, thus would intersect the bottom line of the grooves, as is evident in Fig. 2. A somewhat shallower grooving may be selected, not shallower than the distance from the deepest contact of the mating tooth along tooth faces 17 to tooth crests 16. In this manner a resilience is provided in each tooth segment which is much greater than can be provided by longitudinal slotting of teeth, as for example, along crests 16. Certain previous suggestions for laminated gear teeth provide laminations of spur type gears for partially relieving mating stresses of "high spots" or "low spots" due to inaccurate tooth cutting. Such gears have the segment divisions in the plane of rotation and are not adaptable to spiral or helical gearing for noise reduction. The present invention provides an arrangement for noise reduction to improve gears cut in a helical pattern.

Helical gears transversely cut according to the foregoing description provide tooth resiliency to largely eliminate noise peaks due to inadvertent inaccuracies in hobbing the teeth and errors in the involute shape of the tooth faces arising from uneven wear, stress or hard spots in the face material. Substantially full strength is retained by the perpendicular cutting of the grooves across the teeth, since the force transmitted is always parallel to the grooves. Cutting of grooves or laminations not parallel to the transmitted force decreases the tooth stiffness in the vicinity of the undercut tooth face and results in an uneven resistance to the force exerted thereagainst, the leading edge of a segment being less rigid under stress, and a corresponding irregularity of power transmission results, which is observable as a definite frequency of sound output from the machine, as from the propeller of a ship. The perpendicular slotting herein described provides equal stiffness along the length of each segment to equalize the flow of power as successive segments of a tooth engage in driving or driven relationship.

A further substantial advantage found in slotting helical gears according to the present invention results from changing of the fundamental frequency of gear meshing and the consequent sound output of frequency corresponding thereto. In spur gears this frequency is a prominent characteristic of output. This arises in part from imperfectly cut gears, in part from unequal wear along the working face of the teeth and in part from unequal stiffness as the contact line progresses from crest to pitch circle and back to crest. Helical gears, where two or more teeth are always in contact, decreases the sound output due to said unequal stiffness by providing an averaging effect. There remains a smaller sound output due to the successive engagement of the leading edges of the teeth. This frequency is the same as the frequency for a spur gear and in general is readily heard as a whine transmitted from ships through the water and detected by other craft in the vicinity as a definite indication of a ship of a particular type in the area. Slotting of helical gears as described herein changes this fundamental frequency of gear noise to a frequency outside the audible range and preferably a number of octaves thereabove. The amplitude of the sound of this frequency is thereby reduced in accordance with the well-known relation between frequency and amplitude found by Fourier analysis. Furthermore, the new frequency is in the frequency ranges undergoing attenuation of much greater degree both in water and solid mediums. The mechanism transmitting sound from the gears to the water also appears to selectively attenuate the higher frequencies to a greater degree, so that the resultant observable sound transmitted to a distance therefrom is both decreased at the origin and attenuated in transit, and is rendered more difficult to observe, because of the increase in frequency.

In general, any desired increase over the fundamental frequency due to gear meshing is obtainable by selection of the number of grooves cut in each tooth. However, if this selection is made at random, or merely with a particular factor of increase in mind, the anticipated gain in fundamental frequency is not generally achieved. Special combinations of these three variables, helix angle, groove spacing and face width, are required and these variables are found to be interdependent in achieving the desired frequency increase factor. Various selected values of the variables are found to provide two or more simultaneous leading edge engagements in a gear face wide enough for several teeth to be transmitting power at any instant. The selection of the helix angle and face width, or of intertooth spacing, will conform to prior practice but with the further limitations to provide the frequency shift desired.

Figure 4:
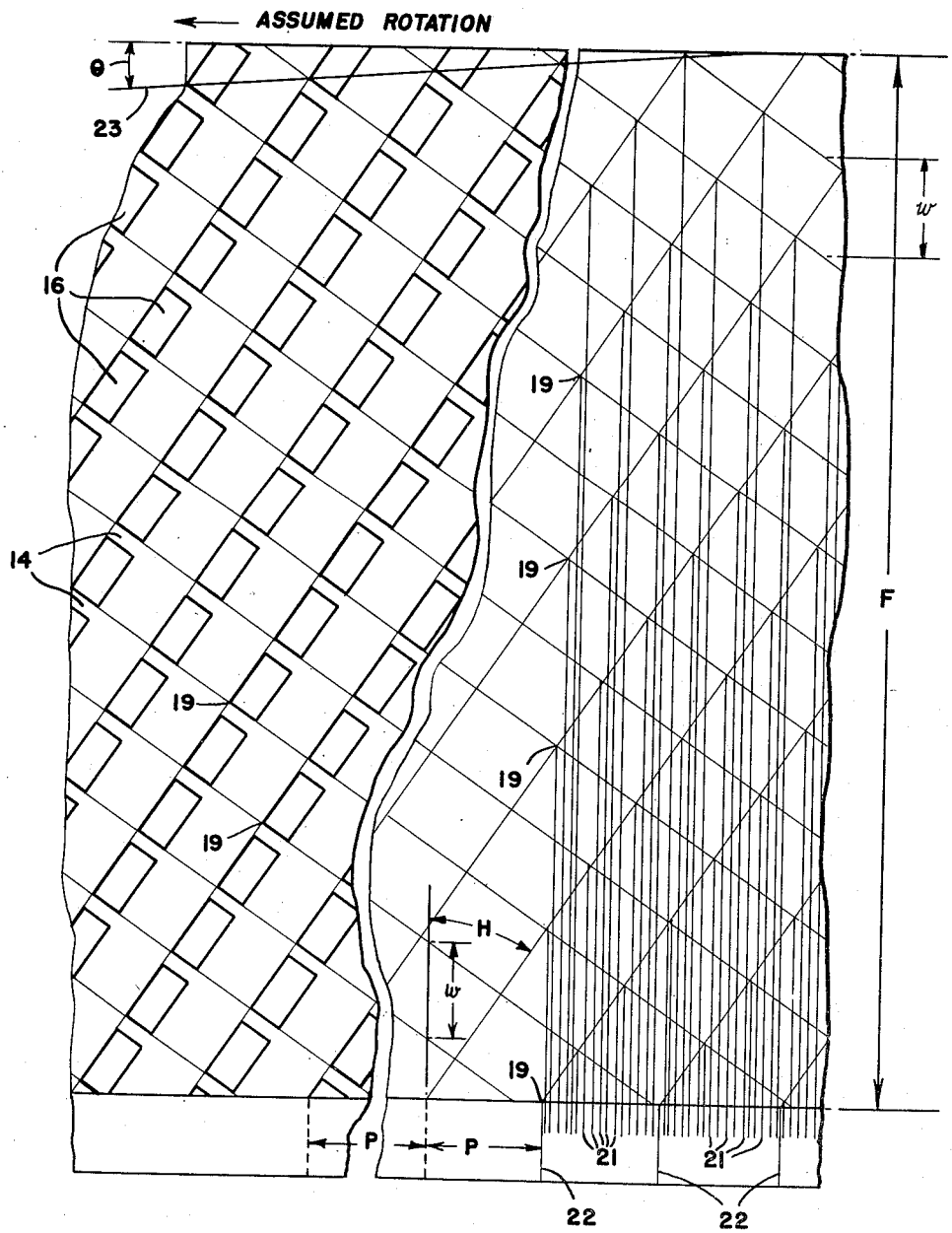
Fig. 4 is a partially rolled-out and a diagrammatic view at the addendum circle of a sample gear showing illustrative constructional dimensions according to the present invention.

Fig. 4 shows in diagrammatic form the manner in which a desired increase in frequency is achieved in a helical gear. A pinion or other gear is shown in rolled-out view in one portion of the diagram, the tooth crests 16 being shown as rectangles separated by grooves 14. Each rectangle is a segment of the tooth crest, the leading edges of which are shown along lines intersecting a vertical line at angle H. Any vertical line in the diagram would lie within a plane including the axis of rotation of the gear, and the angle H is the helix angle at the addendum circle. The leftmost corners of the respective rectangles are also intersections of the tooth leading edge lines and the upper limits of the groove 14, these intersections representing the points of first contact of each tooth segment with the mating gear. In the remainder of the diagram the crest rectangles are omitted to more clearly show the relation in time of the successive engagements of the tooth segments with the mating gear. With rotation as indicated by the arrow the base line from left to right represents time progression. The interval P is the time between meshings of successive tooth crests in a plane perpendicular to the axis. It is the intertooth distance or circular pitch at the addendum circle and is the same as for an ungrooved helical gear. The groove spacing in a direction parallel to the axis of rotation is shown at $w$ and may be called the axial groove spacing, a variable to be determined in the design of a grooved gear for sound reduction. It is shown as the vertical distance between any two of the groove lines in the diagram. These groove lines intersect the leading edge crest lines in a regular pattern and determine contact points 19. These contact points 19 are projected below the base line which corresponds to one face of the gear and are shown at 21 in time sequence between the time marks 22. The time marks 22 are seen to mark the interval between new tooth meshings, the same interval applying to corresponding points of any successive pair of teeth as determined by coincident horizontal projections thereof. The fundamental tooth meshing sound of an ungrooved gear corresponds to this interval. The time marks 21 determine the fundamental of tooth segment meshing sound of the grooved teeth. The increase in frequency of resultant fundamental sound is the same as the increase in number of intervals shown by marks 21. The tangent of the helix angle is not a simple reciprocal fraction $w/P$.

Figure 5:
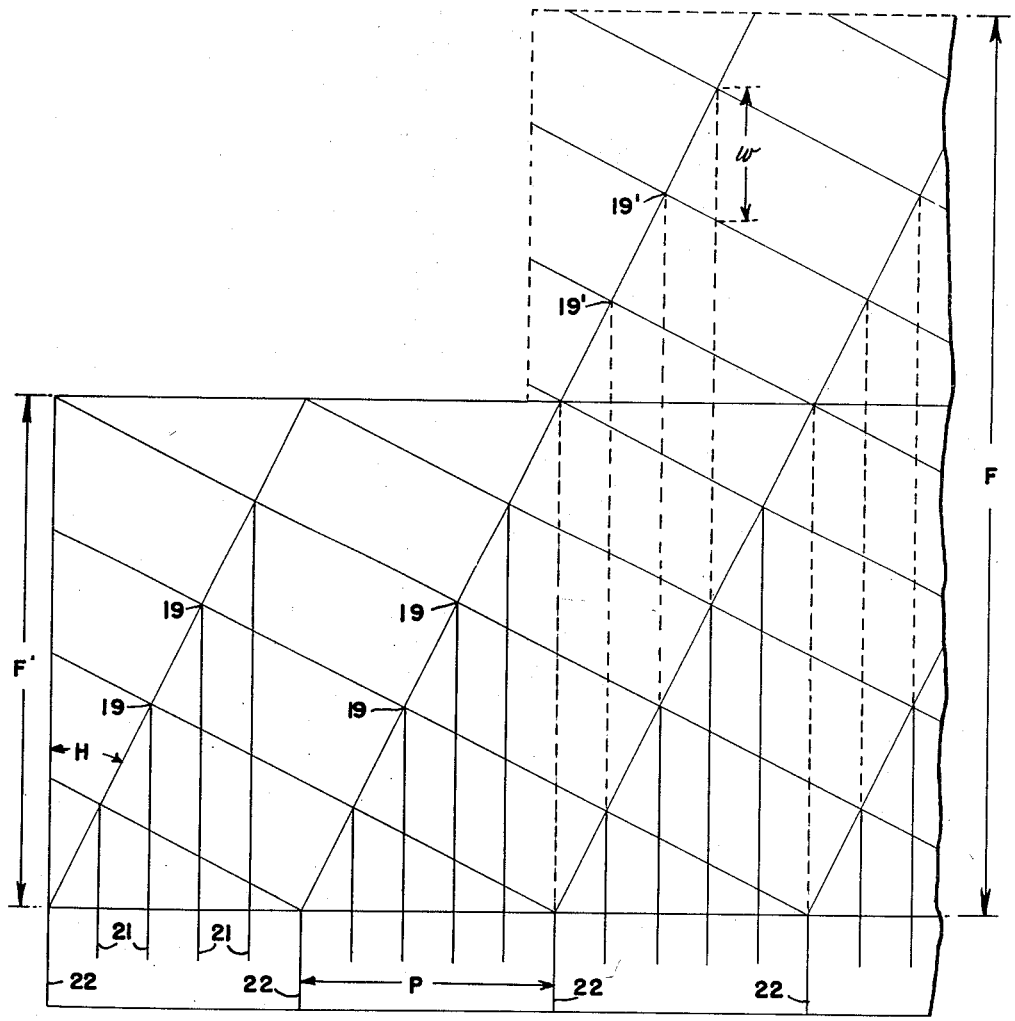
Fig. 5 is a similar diagram of another sample gear illustrating a particular face width relation of the invention.
Figure 6:
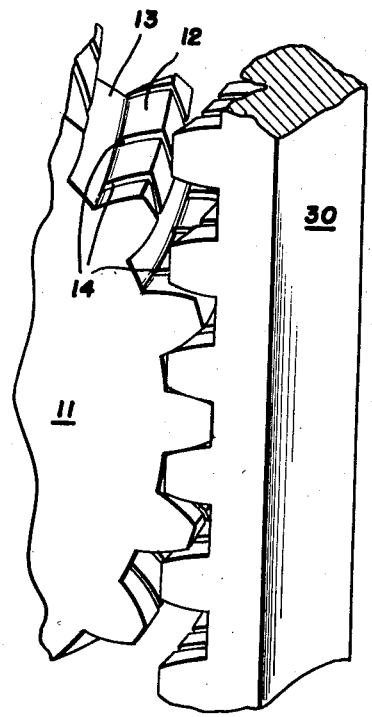
Figure 6 is a diagrammatic view showing the meshing action of a pinion gear and rack.

Fig. 5 shows a gear arrangement for raising the fundamental frequency by a factor of 5, whereas Fig. 4 shows a factor of about 17. In Fig. 5, the interval between marks 22 is evenly divided by lines 21, and horizontal projections of points 19 coincide with corresponding points 19 on successive teeth. It is seen that tan $H=w/P$ in the arrangement of Fig. 5 to produce a single fundamental frequency which is an exact multiple of tooth meshing frequency. In that arrangement there is also shown a face width F for which two segments simultaneously engage the mating gear and a face width F′ which is the widest gear for which the axial spacing $w$ and angle H produce increased frequency for every added segment of each tooth when the circular pitch is P. The pitch P may be increased or the angle H or spacing $w$ may be decreased to increase the maximum face width F′, and to increase the frequency.

In Fig. 5, the horizontal projection of each point 19 falls on the projected position of a point 19 on each successive tooth. The grooves fall at constant axial positions on the mating gear, each tooth having a groove at the same position. In Fig. 4 the axial position of the leading points of contact are not constant and the grooves progress uniformly across the mating gear as seen from the angle $\theta$ made by line 23 with the gear face line, $\theta$ being zero degrees in Fig. 5.

If $\theta$ be made small by proper selection of $w$ and $H$ the successive groove positions shown by line 23 may be made to progress very slowly in an axial direction. Any tendency of the mating gear to wear unevenly because of the grooving is thus eliminated. Wearing of soft gears arranged as in Fig. 5 may be appreciable and may result in inferior performance with regard to sound reduction after ridges have formed on the mating gear. This is avoided by the arrangement of Fig. 4.

It will be understood that the present invention, while described with particular reference to pinion gears, may be equally well applied to other spiral or helical gears, for speed reduction and other purposes, and that for some purposes both mating gears will be grooved perpendicularly to the tooth faces. The noise reduction due to increased frequency of contact is achieved without serious loss of strength. The perpendicular grooving permits ready calculation of segment strengths in contrast to the unpredictable results of grooving in any other manner, and avoiding introduction of any frequency other than the desired increase is fundamental.

It is also evident that the herein disclosed grooving may be applied to either or both of a pair of mating gears including a rack 30 which the helical pinion 11 or bull gear may engage.

Obviously many modifications and variations of the present invention are possible in the light of the above teachings. It is therefore to be understood, that within the scope of the appended claims, the invention may be practiced otherwise than as specifically described.

What is claimed is:

1. In a cylindrical gear having the teeth disposed along the surface of the cylinder at a predetermined helix angle with respect to a plane including the cylindrical axis, a plurality of helical grooves transverse to said teeth and having a helix angle complementary to said predetermined angle, said grooves being of substantially full depth of the teeth and uniformly distributed along the length of the teeth to form tooth segments, the number of tooth segments being selected according to the relationship of helix angle, groove spacing and face width of said gear, and said tooth segments increasing the sound output frequency in direct ratio to the number of said segments formed on each of said teeth when engaging a mating gear in regular ordered succession.

2. The gear of claim 1 wherein said grooves are selected with respect to said predetermined helix angle to occur at a spacing such that the tangent of the helix angle is the axial spacing divided by the circular pitch, whereby the engagements of leading edges of teeth at one face of the gear are an integral part of said regular ordered succession.

3. The gear of claim 1 wherein the grooves in each tooth divide the tooth into equal segments, the interval between successive engagements thereof being a simple fraction of the interval between new tooth engagements with the mating gear.

4. The gear of claim 1 wherein the grooves in each tooth divide the tooth into equal segments except that the first and last engaging segments of each tooth have combined length substantially equal to each other said segment.

5. The gear of claim 4 wherein the nearest corresponding grooves in successive teeth of the gear progress uniformly across the face of a mating gear to prevent the formation of unequally worn portions thereon.

6. The gear of claim 1 wherein the axial spacing distance of the grooves is unevenly divisible into the circular pitch distance of the gear leaving a remainder, thereby causing progression of the axial position on the mating gear where nearest corresponding grooves in successive teeth of said first gear appear.

7. In a helical gear adapted to engage a parallel disposed mating gear, grooves subdividing each tooth of said helical gear into segments having a meshing frequency approximating an integral multiple of the meshing frequency of the teeth of said gears, said grooves having uniform axial spacing approximating a submultiple of the tooth separation measured in a circle of rotation at the tooth crests.

8. In a helical gear having teeth, a plurality of helical grooves uniformly disposed along the lengths of the teeth, a helix angle of said gear selected with respect to the circular pitch such that said grooves of successive teeth lying nearest a circle of rotation of the gear form a helical arc of small helix angle.

9. In the gear of claim 8 a helix angle of the gear selected with respect to the circular pitch at the addendum circle such that said helical arc progresses axially a distance substantially equal to the axial separation of the grooves in one revolution of said gear.

10. A gear comprising helically formed adjacent teeth on the face of said gear, uniformly spaced grooves transversely cut in said teeth to form a plurality of tooth segments, the face width of said gear being an exact multiple of the axial spacing of said grooves, said grooves being helically formed at an angle substantially complementary to the helix angle of said teeth, said grooves extending from the tooth crests to the roots of said teeth for dividing each tooth into a plurality of segments, the number of segments of each said tooth being its factor of increase in fundamental frequency of segment meshings over the corresponding ungrooved tooth meshing frequency.

References Cited in the file of this patent

UNITED STATES PATENTS

| | | |
|---|---|---|
| 280,428 | Wilkinson | July 3, 1883 |
| 1,343,923 | Ljungstrom | June 22, 1920 |
| 1,964,251 | Cowles et al. | June 26, 1934 |
| 2,335,504 | Gazda | Nov. 30, 1943 |